United States Patent
Butz et al.

(10) Patent No.: US 10,661,765 B2
(45) Date of Patent: May 26, 2020

(54) CONTROL DEVICE FOR A CONTROLLABLE BRAKE BOOSTER OF A BRAKING SYSTEM AND METHOD FOR OPERATING A CONTROLLABLE BRAKE BOOSTER OF A BRAKING SYSTEM

(71) Applicant: Robert Bosch GmbH, Stuttgart (DE)

(72) Inventors: Michael Butz, Bietigheim-Bissingen (DE); Manfred Gerdes, Vaihingen/Enz (DE); Patrick Christian Schaefer, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 1061 days.

(21) Appl. No.: 14/336,792

(22) Filed: Jul. 21, 2014

(65) Prior Publication Data

US 2015/0032352 A1    Jan. 29, 2015

(30) Foreign Application Priority Data

Jul. 23, 2013   (DE) .................. 10 2013 214 339

(51) Int. Cl.
| | |
|---|---|
| *B60T 8/17* | (2006.01) |
| *B60T 8/172* | (2006.01) |
| *B60T 13/74* | (2006.01) |
| *B60T 7/04* | (2006.01) |

(52) U.S. Cl.
CPC ............... *B60T 8/17* (2013.01); *B60T 7/042* (2013.01); *B60T 8/172* (2013.01); *B60T 13/745* (2013.01); *B60T 13/746* (2013.01); *B60T 2220/04* (2013.01)

(58) Field of Classification Search
CPC ........... B60T 8/17; B60T 8/172; B60T 13/746
USPC ............................................................ 701/70
See application file for complete search history.

(56) References Cited

U.S. PATENT DOCUMENTS

| | | | |
|---|---|---|---|
| 2005/0156465 A1* | 7/2005 | Gronau .................. | B60T 8/442 303/114.3 |
| 2010/0270854 A1* | 10/2010 | Okano ..................... | B60T 1/10 303/3 |
| 2011/0120122 A1* | 5/2011 | Cagnac .................. | B60T 7/042 60/579 |

(Continued)

FOREIGN PATENT DOCUMENTS

| | | |
|---|---|---|
| CN | 101549685 A | 10/2009 |
| DE | 20 2010 017 605 | 10/2012 |

*Primary Examiner* — Anshul Sood
(74) *Attorney, Agent, or Firm* — Norton Rose Fulbright US LLP; Gerard Messina

(57) ABSTRACT

A control device for a controllable brake booster of a braking system is configured to: establish a setpoint variable regarding a setpoint operation to be carried out with the aid of the controllable brake booster, under consideration of a provided specified variable regarding a setpoint pressure to be set in a partial volume of the braking system; establish a setpoint difference of the setpoint variable, under consideration of the specified variable and an actual variable regarding an actual pressure present in a subarea of the braking system, to establish a corrected setpoint variable taking the established setpoint difference into consideration; and output a control signal which corresponds to the established corrected setpoint variable to the controllable brake booster and/or to the power supply component of the controllable brake booster.

20 Claims, 1 Drawing Sheet

(56) References Cited

U.S. PATENT DOCUMENTS

| | | | | |
|---|---|---|---|---|
| 2011/0178687 A1* | 7/2011 | Anderson | B60T 13/745 | 701/70 |
| 2012/0265417 A1* | 10/2012 | Vollert | B60T 13/745 | 701/70 |
| 2013/0047593 A1* | 2/2013 | Weiberle | B60T 1/10 | 60/327 |
| 2013/0080016 A1* | 3/2013 | Bohn | B60T 7/042 | 701/78 |
| 2013/0086901 A1* | 4/2013 | Bolz | B60T 8/321 | 60/545 |
| 2013/0127237 A1* | 5/2013 | Pfeiffer | B60T 8/4018 | 303/6.01 |
| 2013/0297170 A1* | 11/2013 | Kunz | B60T 8/267 | 701/70 |
| 2015/0021141 A1* | 1/2015 | Cunningham | B60T 13/46 | 192/219.1 |
| 2015/0032352 A1* | 1/2015 | Butz | B60T 7/042 | 701/70 |

\* cited by examiner

CONTROL DEVICE FOR A CONTROLLABLE BRAKE BOOSTER OF A BRAKING SYSTEM AND METHOD FOR OPERATING A CONTROLLABLE BRAKE BOOSTER OF A BRAKING SYSTEM

BACKGROUND OF THE INVENTION

1. Field of the Invention

The present invention relates to a control device for a controllable brake booster of a braking system. The present invention also relates to a controllable brake booster and to a braking system. The present invention further relates to a method for operating a controllable brake booster of a braking system.

2. Description of the Related Art

Published German utility model application DE 20 2010 017 605 U1 describes a brake booster as well as a method and a device for its operation. For controlling/regulating the brake booster a control unit is described, which controls the brake booster based on signals of a sensor device for ascertaining a displacement travel of an input rod and based on signals of a motor of the brake booster. Optionally, signals of a differential path sensor for determining a relative deflection between the input rod and a booster body, or of a force sensor for determining a driver force, may also be evaluated by the control unit.

BRIEF SUMMARY OF THE INVENTION

It is possible with the aid of the present invention to limit an actual pressure which is present in at least a subarea of the braking system, in particular in its master brake cylinder, to useful values. Above all, it may be prevented that higher actual pressures than are in fact desirable occur in the braking system/master brake cylinder due to an operation of the controllable brake booster, for example simultaneously with a brake fluid recirculation. In this way, loading of the braking system due to excessively high actual pressures which occur in the braking system/master brake cylinder is reliably preventable/limitable.

In one advantageous specific embodiment of the control device, an adjustment travel of the brake pedal, a rod travel of an input rod, a driver brake force, a driver brake pressure, a setpoint system pressure and/or a setpoint brake pressure may be taken into consideration as the at least one specified variable with the aid of the activating device. In this way, a situation-optimized adaption of the operation of the controllable brake booster to a driving situation, to driver behavior and to similar basic conditions is possible.

For example, the setpoint variable is establishable, at least under consideration of the at least one specified variable and a characteristic curve stored in the control device. The operation of the controllable brake booster is thus easily adaptable to a desired characteristic.

In one further advantageous specific embodiment, the setpoint difference of the setpoint variable is establishable, under consideration of the at least one specified variable and a measured and/or estimated system pressure as the at least one actual variable. In this way, it may be reliably prevented even in the event of ABS-operation that higher pressures than desired occur in the braking system/master brake cylinder.

A corrected setpoint motor torque of a motor of a controllable brake booster which is designed as an electromechanical brake booster may advantageously be established as a corrected setpoint variable, the electromechanical brake booster and/or the power supply component of the electromechanical brake booster being activatable with the aid of the at least one control signal in such a way that the motor may be operated using a motor torque which corresponds to the established corrected setpoint variable. A pressure load of the braking system may thus be limited with the aid of a measured/estimated pressure signal and activation of the motor torques. The level of the pressure limitation is electronically variable. Such a procedure is easy to carry out. However, it is pointed out that the use of the present invention is not limited to an electromechanical brake booster.

The above-described advantages are also implemented with a controllable brake booster of a braking system including a corresponding control device.

A braking system including a controllable brake booster and a corresponding control device, or a controllable brake booster including such a control device, also contributes to the implementation of the above-described advantages.

The above-described advantages are also assured when a corresponding method for operating a controllable brake booster of a braking system is carried out. The method is refinable in accordance with the above-described specific embodiments of the control device.

DETAILED DESCRIPTION OF THE INVENTION

Figure 1:
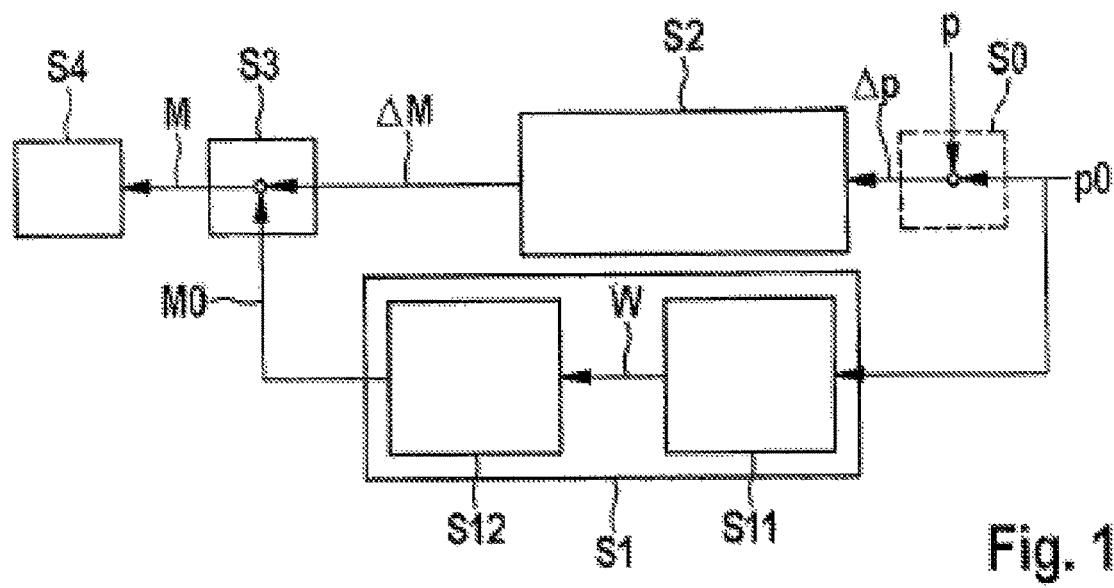
FIG. 1 shows a flow chart to explain one specific embodiment of the method for operating a controllable brake booster of a braking system.

FIG. 1 shows a flow chart to explain one specific embodiment of the method for operating a controllable brake booster of a braking system.

The method schematically shown in FIG. 1 includes a method step S1 in which an (uncorrected) setpoint variable M0 regarding a setpoint operation to be carried out with the aid of the controllable brake booster is established. (Uncorrected) setpoint variable M0 is established at least under consideration of at least one specified variable p0 regarding at least one setpoint pressure to be set in at least one partial volume of the braking system. In the specific embodiment of FIG. 1, a setpoint system pressure p0 is taken into consideration as the at least one specified variable p0. An (uncorrected) setpoint motor torque M0 of a motor of a controllable brake booster which is designed as an electromechanical brake booster is established in method step S1 as (uncorrected) setpoint variable M0.

However, as an alternative or in addition to setpoint system pressure p0, it is also possible to take an adjustment travel of a brake pedal, a rod travel of an input rod, a driver brake force, a driver brake pressure and/or a setpoint brake pressure (to be set in at least one wheel brake cylinder of the braking system) into consideration as the at least one specified variable p0. Moreover, the embodiment of the method for operating an electromechanical brake booster schematically shown in FIG. 1 shall be understood merely by way of example. A pneumatic brake booster or a hydraulic brake booster may also be operated as a controllable brake booster with the aid of the method. There are possibilities for both cases to electronically control/influence, e.g., with the aid of valves, an operation/boosting of the pneumatic or hydraulic brake booster. It is thus also possible to establish a corresponding setpoint variable M0 for a pneumatic brake booster or for a hydraulic brake booster in method step S1.

In the specific embodiment of FIG. 1, method step S1 includes two substeps S11 and S12. In substep S11, first a working point W of the motor of the electromechanical brake booster is established, under consideration of setpoint system pressure p0 as the at least one specified variable p0 and a predefined characteristic curve. This procedure may also be described as an "open loop gain torque." As an alternative to the characteristic curve, a constant factor or a characteristic map may also be taken into consideration when establishing working point W. Thereafter, (uncorrected) setpoint motor torque M0 is established as (uncorrected) setpoint variable M0, taking working point W into consideration, in further substep S12. In particular an efficiency of the motor of the electromechanical brake booster may also be taken into consideration. In this way, an (uncorrected) setpoint motor torque M0 may be calculated, which is corrected with the aid of the known gearbox efficiency as a function of the direction.

In parallel with, prior to or after method step S1, a method step S2 is also carried out, in which a setpoint difference ΔM of (uncorrected) setpoint variable M0 is established, under consideration of the at least one specified variable p0 and at least one actual variable p regarding at least one actual pressure which is present in at least one subarea of the braking system. Preferably a measured actual pressure, in particular a measured system pressure p, is taken into consideration as the at least one actual variable p. As an alternative or in addition, setpoint difference ΔM of (uncorrected) setpoint variable M0 may also be established under consideration of an estimated pressure, in particular an estimated system pressure, as the at least one actual variable p (together with the at least one specified variable p0).

In the specific embodiment of FIG. 1, a pressure difference Δp is calculated from setpoint system pressure p0 used as the at least one specified variable p0 and system pressure p measured as the at least one actual variable p in an optional method step S0 prior to method step S2. However, this shall only be interpreted by way of example.

Method step S2 thus ensures a situation-dependent/pressure-dependent correction of (uncorrected) setpoint variable M0 established in method step S1. In particular, it is possible to quickly and reliably detect the presence of (almost) an overpressure based on the evaluated actual variable p. By appropriately establishing setpoint difference ΔM of (uncorrected) setpoint variable M0, it is possible, e.g., to compensate for pressure fluctuations due to ESP activities or temperature influences. In method step S2, a so-called proportional-integral-differential (PID) control may be advantageously carried out using integrated filter algorithms and/or working point-dependent boosting factors.

The adjustment travel of the brake pedal, the rod travel of the input rod, the driver brake force, the driver brake pressure and/or the setpoint brake pressure may also be (additionally) taken into consideration as the at least one specified variable p0 when establishing setpoint difference ΔM of (uncorrected) setpoint variable M0. The method shown in FIG. 1 may thus also be carried out in varied modifications.

In a further method step S3 a corrected setpoint variable M is established, taking established setpoint difference ΔM (and uncorrected setpoint variable M0) into consideration. For example, a corrected setpoint motor torque M of the motor of the electromechanical brake booster is established for this purpose in method step S3 from (uncorrected) setpoint variable M0 and setpoint difference ΔM.

The method moreover includes a method step S4 in which the controllable brake booster and/or a power supply component of the controllable brake booster is/are activatable, taking established corrected setpoint variable M into consideration, in such a way that the controllable brake booster is operated in accordance with established corrected setpoint variable M. For example, the electromechanical brake booster and/or the power supply component of the electromechanical brake booster may be activated for this purpose in such a way that the motor is operated with a motor torque which corresponds to established corrected setpoint motor torque M as the established corrected setpoint variable M.

Figure 2:
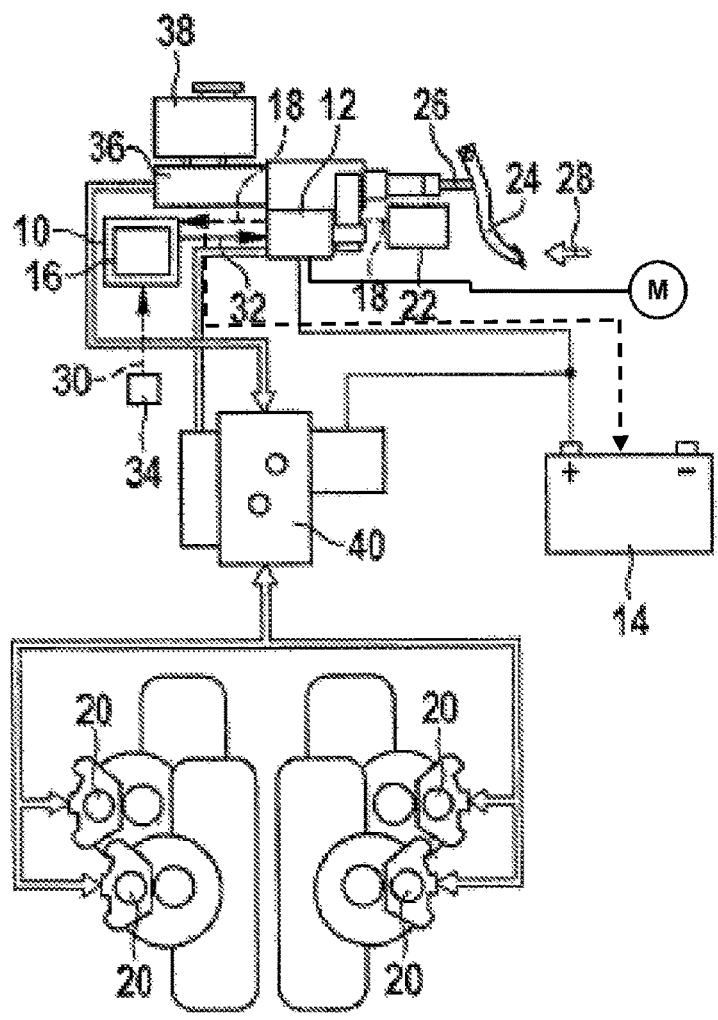
FIG. 2 shows a schematic illustration of one specific embodiment of the control device for a controllable brake booster of a braking system.

FIG. 2 shows a schematic illustration of one specific embodiment of the control device for a controllable brake booster of a braking system.

Control device 10 schematically shown in FIG. 2 is designed to activate a controllable brake booster 12 and/or a power supply component 14 of controllable brake booster 12. Controllable brake booster 12 is designed as an electromechanical brake booster merely by way of example. However, the usability of control device 10 is not limited to such a brake booster type. For example, control device 10 may also be usable for activating a pneumatic brake booster or a hydraulic brake booster in one other specific embodiment.

Control device 10 includes an activating device 16, which is designed to establish an (uncorrected) setpoint variable regarding a setpoint operation to be carried out with the aid of controllable brake booster 12, at least under consideration of at least one provided specified variable 18 regarding at least one setpoint pressure to be set in at least one partial volume of the braking system. An (uncorrected) setpoint motor torque of a motor of controllable brake booster 12 is establishable as the (uncorrected) setpoint variable in the specific embodiment of FIG. 2 merely by way of example.

In the specific embodiment of FIG. 2, the braking system cooperating with control device 10 includes a sensor 22, with the aid of which an adjustment travel of a brake pedal 24, a rod travel of an input rod 26, a driver brake force 28 and/or a driver brake pressure are ascertainable and providable to control device 10 as the at least one specified variable 18. Activating device 16 is designed in this case to take at least one variable provided by sensor 22 into consideration as the at least one specified variable 18 in the establishment of the (uncorrected) setpoint variable. For example, activating device 16 may establish a setpoint system pressure and/or a setpoint brake pressure (to be set in at least one wheel brake cylinder 20 of the braking system), taking the at least one variable output by sensor 22 to control device 10 into consideration. As an alternative to this procedure, however, it may also be possible to take a setpoint system pressure and/or a setpoint brake pressure determined by another component of the braking system into consideration as the at least one specified variable 18 with the aid of activating device 16.

The (uncorrected) setpoint variable is establishable, for example, at least under consideration of the at least one specified variable 18 and a characteristic curve stored in (a memory unit not shown of) control device 10. For example, activating device 16 may be designed to carry out method step S1 of the above-described method.

Activating device 16 is additionally designed to establish a setpoint difference of the (uncorrected) setpoint variable, under consideration of the at least one specified variable 18 and at least one provided actual variable 30 regarding at least one actual pressure present in at least one subarea of the braking system.

This may take place in accordance with method step S2 of the above-described method. In the specific embodiment of FIG. 2, the braking system includes a system pressure sensor 34, which ascertains a system pressure as the at least one actual variable 30. As an alternative or in addition, the setpoint difference of the (uncorrected) setpoint variable may also be establishable under consideration of the at least one specified variable 18 and a measured brake pressure, an estimated system pressure and/or an estimated brake pressure as the at least one actual variable 30.

Taking the measured system pressure and/or the estimated system pressure into consideration as the at least one actual variable 30 assures the advantage that it is possible to respond in a targeted manner to hydraulic fluctuations in the braking system, for example due to a brake fluid recirculation from a storage chamber (not shown) into a master brake cylinder 36 of the braking system, or a brake fluid reservoir 38 of the braking system, with the aid of an ESP system 40 of the braking system, during the (later) activation of controllable brake booster 12 and/or its power supply component 14. In particular the pressure fluctuations which occur in the braking system may be taken into consideration when establishing the desired operation of controllable brake booster 12 in such a way that its operation is quickly adaptable to the same.

A corrected setpoint variable may subsequently be established with the aid of activating device 16, taking the established setpoint difference (and the uncorrected setpoint variable) into consideration. At least one control signal 32 corresponding to the established corrected setpoint variable may be output to controllable brake booster 12 and/or power supply component 14 of controllable brake booster 12. Controllable brake booster 12 and/or power supply component 14 of controllable brake booster 12 is/are activatable with the aid of the at least one control signal 32 of control device 10 in such a way that controllable brake booster 12 may be operated in accordance with the established corrected setpoint variable. Control device 10 thus also assures the advantages of the above-described method.

In particular an electromechanical brake booster 12 and/or power supply component 14 of an electromechanical brake booster 12 is/are easily activatable with the aid of the at least one control signal 32 in such a way that the motor may be operated with a motor torque which corresponds to the established corrected setpoint variable. It is thus possible to deliberately circumvent the problem that conventionally frequently excessive pressures occur, in particular in the case of an electric motor-operated actuator due to a gear ratio of the actuator operation and the frictions that occur in connection with brake fluid recirculation. The present invention thus assures an advantageous operation of electromechanical brake booster 12. The present invention thus contributes to the additional acceptance of a dry, controllable brake booster 12, which requires no hydraulics at the driver's foot, needs no pneumatic negative pressure supply and is usable also with a deactivated internal combustion engine. The use of the present invention for electromechanical brake booster 12 thus utilizes the advantages that the same may be easily electronically adjusted and regulated. Moreover, the motor torque which acts directly and proportionally on the brake boost is directly accessible from electromechanical brake booster 12. The level of pressures which are increased with the aid of electromechanical brake booster 12 may thus be heavily influenced in a direct and proportional manner.

The advantages of control device 10 are also assured with a controllable brake booster 12 of a braking system including such a control device 10, in a braking system including a controllable brake booster 12 and a corresponding control device 10, and a braking system including a controllable brake booster 12 which includes a control device 10 designed in this way. However, control device 10 may also be designed as a component which may be situated separately from controllable brake booster 12 and/or the braking system. Control device 10 may also be integrated into a braking system control system or into a central vehicle control system.

What is claimed is:

1. A control device for a controllable brake booster of a braking system, comprising:
    an activating device configured to:
        (i) establish a setpoint variable for a setpoint operation to be carried out with the aid of the controllable brake booster, under consideration of at least one provided specified variable regarding at least one setpoint pressure to be set in at least one partial volume of the braking system;
        (ii) establish a setpoint difference of the setpoint variable by applying the at least one provided specified variable and at least one provided actual variable regarding at least one actual pressure which is present in at least one subarea of the braking system to, and executing, a proportional-integral-derivative (PID) control that produces a result based on historical differences between the specified and actual variables;
        (iii) establish a corrected setpoint variable taking the established setpoint difference into consideration; and
        (iv) output at least one control signal, which corresponds to the established corrected setpoint variable, to control at least one of the controllable brake booster and a power supply component of the controllable brake booster, to thereby operate the controllable brake booster in accordance with the established corrected setpoint variable.

2. The control device as recited in claim 1, wherein the at least one specified variable includes at least one of an adjustment travel of a brake pedal, a rod travel of an input rod, a driver brake force, a driver brake pressure, a setpoint system pressure, and a setpoint brake pressure.

3. The control device as recited in claim 2, wherein the setpoint variable is established under consideration of the at least one specified variable and a characteristic curve stored in the control device.

4. The control device as recited in claim 3, wherein the setpoint difference of the setpoint variable is established by taking into consideration (i) the at least one specified variable and (ii) a system pressure as the at least one actual variable, wherein the system pressure is a pressure of the braking system.

5. The control device as recited in claim 3, wherein:
    a corrected setpoint motor torque of a motor of a controllable brake booster configured as an electromechanical brake booster is established as the corrected setpoint variable; and
    at least one of the electromechanical brake booster and the power supply component of the electromechanical brake booster is activated with the aid of the at least one control signal in such a way that the motor is operated with a motor torque which corresponds to the established corrected setpoint variable.

6. A method for operating a controllable brake booster of a braking system, comprising:
(i) establishing a setpoint variable for a setpoint operation to be carried out with the aid of the controllable brake booster, under consideration of at least one provided specified variable regarding at least one setpoint pressure to be set in at least one partial volume of the braking system;
(ii) establishing a setpoint difference of the setpoint variable by applying the at least one provided specified variable and at least one provided actual variable regarding at least one actual pressure which is present in at least one subarea of the braking system to, and executing, a proportional-integral-derivative (PID) control that produces a result based on historical differences between the specified and actual variables;
(iii) establishing a corrected setpoint variable taking the established setpoint difference into consideration; and
(iv) activating at least one of the controllable brake booster and a power supply component of the controllable brake booster, taking into consideration the established corrected setpoint variable such that the controllable brake booster is operated in accordance with the established corrected setpoint variable.

7. The method as recited in claim 6, wherein the at least one specified variable includes at least one of an adjustment travel of a brake pedal, a rod travel of an input rod, a driver brake force, a driver brake pressure, a setpoint system pressure, and a setpoint brake pressure.

8. The method as recited in claim 7, wherein the setpoint variable is established under consideration of the at least one specified variable and a characteristic curve stored in the control device.

9. The method as recited in claim 8, wherein the setpoint difference of the setpoint variable is established by taking into consideration (i) the at least one specified variable and (ii) a system pressure as the at least one actual variable, wherein the system pressure is a pressure of the braking system.

10. The method as recited in claim 8, wherein:
a corrected setpoint motor torque of a motor of a controllable brake booster configured as an electromechanical brake booster is established as the corrected setpoint variable; and
at least one of the electromechanical brake booster and the power supply component of the electromechanical brake booster is activated with the aid of the at least one control signal in such a way that the motor is operated with a motor torque which corresponds to the established corrected setpoint variable.

11. A method for operating a controllable brake booster of a brake system, comprising:
obtaining, by the control unit and from a sensor, an actual value of pressure of the brake system;
in response to a driver operation of a brake pedal, which corresponds to a setpoint brake system pressure, determining, by a control unit and based on the setpoint brake system pressure and on the actual value of the brake system pressure, an initial value for a torque of a motor that controls the brake booster;
executing, by the control unit, a proportional-integral-derivative (PID) control using a difference between a value of the setpoint brake system pressure and the actual value of the brake system pressure to obtain a correction value for the torque of the motor, wherein the executed PID control produces a result based on historical differences between the value of the setpoint brake system pressure and the actual value of the brake system pressure;
applying, by the control unit, the correction value to the initial value to obtain a corrected value for the torque of the motor; and
performing a control of the motor based on the corrected value for the torque of the motor.

12. The control device as recited in claim 1, wherein the establishment of the corrected setpoint variable is performed by applying a correction value that is based on the established setpoint difference to the setpoint variable established in (i) based on the provided specified variable.

13. The control device as recited in claim 1, wherein the establishment of the setpoint variable in (i) is performed without consideration of the provided actual variable.

14. The control device as recited in claim 13, wherein the establishment of the corrected setpoint variable is performed by applying a correction value that is based on the established setpoint difference to the setpoint variable established in (i) based on the provided specified variable.

15. A control device for a controllable brake booster of a braking system, comprising:
an activating device configured to:
(i) based on a value of a setpoint pressure to be set in at least one partial volume of the braking system and independent of a value of an actual pressure in the at least one partial volume of the braking system, establish a setpoint value of a torque of a motor of the brake booster for performing a setpoint booster operation;
(ii) determine a difference between the value of the setpoint pressure and the value of the actual pressure;
(iii) using the determined difference, execute a proportional-integral-derivative (PID) control that produces a result based on historical differences between values of the setpoint pressure and values of the actual pressure;
(iv) based on the result of the PID control, establish a correction value for the torque of the motor of the brake booster;
(v) modify the established setpoint value of the torque of the motor of the brake booster by applying the established correction value to the established setpoint value of the torque of the motor of the brake booster, thereby obtaining a corrected value of the torque of the motor of the brake booster; and
(vi) based on the corrected value of the torque of the motor of the brake booster, output a control signal to control at least one of the controllable brake booster and a power supply component of the controllable brake booster.

16. The control device as recited in claim 15, wherein:
the brake booster is an electromechanical brake booster; and
the control signal controls the at least one of the controllable brake booster and the power supply component of the controllable brake booster to operate the motor of the brake booster with a motor torque at the corrected value.

17. The control device as recited in claim 15, wherein the value of the setpoint pressure is obtained based on at least one of an adjustment travel of a brake pedal, a rod travel of an input rod, a driver brake force, and a driver brake pressure.

18. The control device as recited in claim 15, wherein the value of the setpoint pressure is obtained based on at least one of a setpoint system pressure and a setpoint brake pressure.

19. The control device as recited in claim 15, wherein the setpoint value of the torque is established under consideration of the value of the setpoint pressure and a characteristic curve stored in the control device.

20. The control device as recited in claim 15, wherein, in (v), the corrected value of the torque of the motor of the brake booster is obtained by adding to each other the setpoint value of the torque and the correction value for the torque.

\* \* \* \* \*